UNITED STATES PATENT OFFICE.

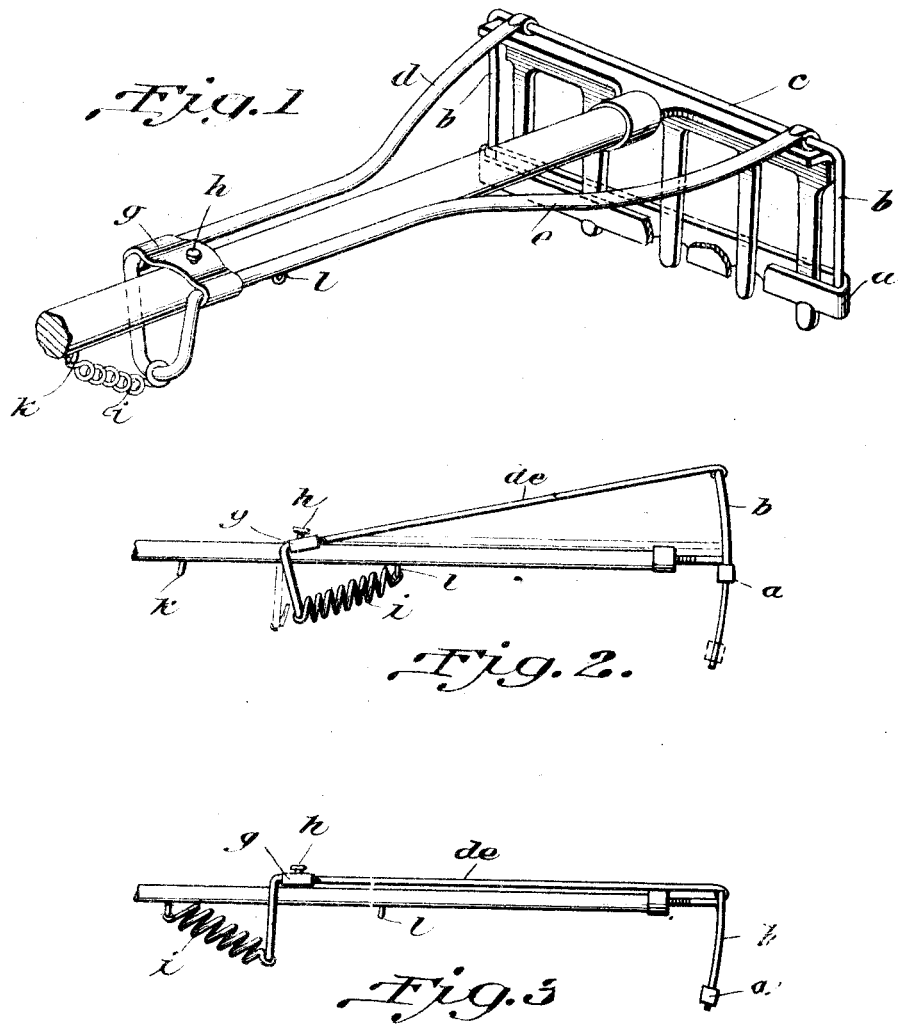

NICHOLAS J. CLUTE, OF SCHENECTADY, NEW YORK; M. MATILDA CLUTE EXECUTRIX OF SAID NICHOLAS J. CLUTE, DECEASED.

SELF-CLEANING RAKE.

1,158,640. Specification of Letters Patent. Patented Nov. 2, 1915.

Application filed August 26, 1914. Serial No. 858,704.

*To all whom it may concern:*

Be it known that I, NICHOLAS J. CLUTE, a citizen of the United States, residing at Schenectady, in the county of Schenectady and State of New York, have invented certain new and useful Improvements in Self-Cleaning Rakes; and I do hereby declare the following to be a full, clear, and exact description of the invention, such as will enable others skilled in the art to which it appertains to make and use the same.

My invention relates to new and useful improvements in rakes and more particularly to simple and efficient cleaning means that will operate in an extremely reliable and effective manner to automatically strip the teeth of the rake of leaves, refuse or other foreign matter and which is so constructed as to be readily attached to and detached from rakes of various forms.

Another object of importance is to provide novel means to automatically strip the teeth, which means consist of a stripping bar, spring and rods connecting the stripping bar with the spring, which parts are arranged in a novel manner so that the rake may be operated in the usual manner without being interfered with and being capable of being readily assembled and disassembled.

The above and additional objects are accomplished by such means as are shown in the accompanying drawings, described in the following specification and then more particularly pointed out as claimed.

With reference to the drawings, wherein I have illustrated the preferred embodiment of my invention as it is reduced to practice, and throughout the several views in which similar reference letters designate corresponding parts, Figure 1 is a perspective view of a rake with my improved cleaning means attached. Fig. 2 shows the rake with the coiled spring hooked on the pin L, which holds the stripping bar A up under the rake head. Fig. 3 shows the rake with the coiled spring *i* hooked on the pin *k*.

—*a*— in Fig. —1— is the cleaning strip which may be of sheet metal or wire of the form I may choose to use, it contains a number of openings corresponding to the number, size, and form of the teeth of said rake, upon which said cleaning strip moves freely up and down, very nearly the length of said teeth.

The aforesaid cleaning strip —*a*— is connected at opposite ends to the piece of rod or wire —*b*— which extends upwardly to the head of said rake —*c*— where it meets the operating arms —*d*— and —*e*— the ends of which are flattened and bent around the rod or wire —*b*— forming an easy working joint. The said operating arms —*d*— and —*e*— extend along the handle of the rake to a point or center corresponding with the curve of said teeth, where they are held by the metal strip —*g*— the opposite ends of which are bent tightly around the operating arms —*d*— and —*e*—. The metal piece —*g*— is held in position by the screw —*h*— which passes through it into the handle of the rake forming a freely moving hinge.

The rods or wires forming the operating arms —*d*— and —*e*— are bent downward and on opposite sides of the said handle in the form of the letter —U— at the lower part of which a coiled spring —*i*— is attached as shown in Figs. —1—2— and —3—, the opposite end of which can be quickly connected to either of the pins —*k*— or —*l*—.

In operation when the rake is being used in the ordinary manner and foreign matter is forced between the teeth, the stripping bar —*a*— is moved upwardly by engagement thereof with the grass, leaves and other foreign matter while the rake is being drawn upon the ground. The upward movement of the cleaning strip —*a*— is against the tension of the coiled spring —*i*— when it is hooked on pin —*k*— and when the rake is raised from the ground the cleaning strip —*a*— through the action of the coiled spring —*i*— is forced downward to the points of the teeth thereby removing all refuse off of said teeth. When the spring —*i*— is hooked on the pin —*l*— the cleaning bar —*a*— is held up under the head of the rake by the said spring; in this position to clean the rake invert it and tap it on the ground, when the cleaning strip —*a*— will be forced to the points of the teeth thereby removing all refuse.

It will be readily seen that I have provided an inexpensive, simple, effective and durable self-cleaning rake attachment, that will operate in a reliable manner to automatically clean and strip the teeth of a rake of any refuse that may have collected thereon.

The arrangement of the parts does not interfere with the use of the rake in the usual manner.

In practice I have found that the form of my invention illustrated in the drawings and referred to in the above description, is the most efficient and practical. Yet I realize that as the conditions will vary in the many forms of rakes, I desire it to be understood that various, minor changes in details of construction, proportion and arrangements of the several parts may be resorted to when required without sacrificing any of the advantages of my invention as herein set forth.

Having thus described my invention, what I claim and desire to secure by Letters Patent is—

The combination with a rake consisting of a handle, a head, and teeth on said head, of a cleaning bar or stripper, said cleaning bar moving freely up and down on said teeth, operating arms which form a movable joint with an inverted —U— shaped rod or wire which is firmly secured to the said cleaning bar at opposite ends, the said operating arms extending on either side of the handle to a point where they are held in position by a metal strip the opposite ends of which are bent tightly around the said arms, the aforesaid metal strip being loosely secured to the said rake handle and forming a hinge at that point, the operating arms being bent downward on either side of the handle of the said rake in the form of the letter —U— at the lower part of which a coiled spring is secured the free end of which can be hooked on either of the pins which are driven in the handle of the said rake underneath the same and on either side of the aforesaid —U— shaped projecting piece.

NICHOLAS J. CLUTE.

Witnesses:
  OLIVER VAN AMBERG,
  EARL A. TWOMBLEY.